(12) United States Patent
Smith

(10) Patent No.: US 12,352,360 B2
(45) Date of Patent: *Jul. 8, 2025

(54) GRAVITY ACTUATED FLOW CONTROL APPARATUS AND METHOD

(71) Applicant: Strom W. Smith, Ocean Springs, MS (US)

(72) Inventor: Strom W. Smith, Ocean Springs, MS (US)

(*) Notice: Subject to any disclaimer, the term of this patent is extended or adjusted under 35 U.S.C. 154(b) by 0 days.

This patent is subject to a terminal disclaimer.

(21) Appl. No.: 18/408,021

(22) Filed: Jan. 9, 2024

(65) Prior Publication Data

US 2024/0142012 A1     May 2, 2024

Related U.S. Application Data

(63) Continuation of application No. 18/218,444, filed on Jul. 5, 2023, now Pat. No. 11,879,552, which is a continuation-in-part of application No. 17/172,532, filed on Feb. 10, 2021, now Pat. No. 11,732,815, which is a continuation of application No. 16/984,538, filed on Aug. 4, 2020, now Pat. No. 10,962,126.

(60) Provisional application No. 62/882,741, filed on Aug. 5, 2019.

(51) Int. Cl.
| | |
|---|---|
| *F16K 17/12* | (2006.01) |
| *F16K 17/164* | (2006.01) |
| *F16K 31/30* | (2006.01) |
| *C01B 17/02* | (2006.01) |

(52) U.S. Cl.
CPC ............ *F16K 17/12* (2013.01); *F16K 17/164* (2013.01); *F16K 31/30* (2013.01); *C01B 17/02* (2013.01)

(58) Field of Classification Search
CPC ........ F16K 17/12; F16K 17/164; F16K 31/30; C01B 17/02
See application file for complete search history.

(56) References Cited

U.S. PATENT DOCUMENTS

| | | | |
|---|---|---|---|
| 2,092,793 A | 9/1937 | Abercrombie | |
| 2,888,038 A | 5/1959 | Smalley | |
| 3,294,116 A | 12/1966 | Tremeau | |
| 4,121,619 A | 10/1978 | Pauliukonis | |
| 6,155,313 A | 12/2000 | Smalley | |
| 9,752,696 B2 | 9/2017 | Smith | |
| 10,054,236 B2 | 8/2018 | Smith | |
| 11,879,552 B2 * | 1/2024 | Smith | ................... F16K 17/164 |

* cited by examiner

*Primary Examiner* — P. Macade Nichols
(74) *Attorney, Agent, or Firm* — Keeling Law, LLC; Kenneth A. Keeling; Mark S. Solomon

(57) ABSTRACT

Embodiments of a flow control apparatus of the present invention generally include a vessel equipped with a pre-filter assembly, a substantially vertical, bottom-feeding liquid inlet line, a vapor space pressure equalization line, and a liquid outlet, wherein the vessel contains a pair of connected, horizontally oriented, O-ring and/or piston ring equipped sealing plates that are designed to rise and fall as a pair in response to gravity provided liquid pressure in the sump of the vessel, whereby an elevation of the sealing plates provides the liquid in fluid communication with the liquid outlet via internal orifices fluidly connected to one or more fluid conduits. Embodiments of a method of using embodiments of an apparatus of the present invention to control liquid flow are also provided.

13 Claims, 5 Drawing Sheets

GRAVITY ACTUATED FLOW CONTROL APPARATUS AND METHOD

CROSS-REFERENCE TO RELATED APPLICATIONS

This application is a continuation application of co-pending U.S. patent application Ser. No. 18/218,444, filed on Jul. 5, 2023, which application is a continuation-in-part application of U.S. patent application Ser. No. 17/172,532, filed on Feb. 10, 2021, now U.S. Pat. No. 11,732,815, which application is a continuation application of U.S. patent application Ser. No. 16/984,538, filed on Aug. 4, 2020, now U.S. Pat. No. 10,962,126, which application claims the benefit of U.S. Provisional Patent Application No. 62/882,741, filed on Aug. 5, 2019, all of which applications are incorporated herein by reference as if reproduced in full below.

STATEMENT REGARDING FEDERALLY SPONSORED RESEARCH OR DEVELOPMENT

Not Applicable.

FIELD OF THE INVENTION

The present invention generally relates to sulfur processing. More particularly, embodiments of the present invention are directed to an apparatus and method for controlling the flow of molten sulfur in an industrial application.

BACKGROUND OF THE INVENTION

In many applications, controlled flow of a liquid, such as molten sulfur, is accomplished by utilizing a device, whereby liquid is introduced to an apparatus such that the liquid contacts a moveable boundary component that is directionally biased (e.g., downward) such that the boundary component prevents flow of the liquid until the liquid pressure exceeds the biasing force, whereupon the boundary component is displaced (e.g., upward) and the liquid is allowed to flow through a fluid outlet. In such a system, once the liquid pressure diminishes to a level less than the biasing force, the boundary component is replaced in its original position (i.e., "reseals"), and liquid flow through the fluid outlet is prevented. Historically, the biasing force was provided by a spring or the like, which is prone to wear and degradation over time. Some recent apparatuses utilize a pressurized fluid to provide the biasing force. Examples of such technology are disclosed in U.S. Pat. No. 9,752,696, issued Sep. 5, 2017, and U.S. Pat. No. 10,054,236, issued Aug. 21, 2018, both to the present inventor, which are both incorporated herein by reference in their entirety. While such technology is useful, in certain systems it would be useful to provide the required biasing force without the necessity of providing and maintaining a pressurized fluid.

BRIEF SUMMARY OF THE INVENTION

Embodiments of an apparatus of the present invention generally include a vessel equipped with a substantially vertical, bottom-feeding liquid inlet line, a vapor space pressure equalization line, and a liquid outlet, wherein the vessel contains a pair of connected, horizontally oriented, O-ring equipped sealing plates that are designed to rise and fall as a pair in response to gravity provided liquid pressure in the sump of the vessel, whereby an elevation of the sealing plates provides the liquid in fluid communication with the liquid outlet. Embodiments of a method of using embodiments of an apparatus of the present invention are also provided.

BRIEF DESCRIPTION OF THE DRAWINGS

For a more complete understanding of the present invention, reference is now made to the accompanying drawings, in which.

DETAILED DESCRIPTION OF EXEMPLARY EMBODIMENTS OF THE INVENTION

Figure 1:
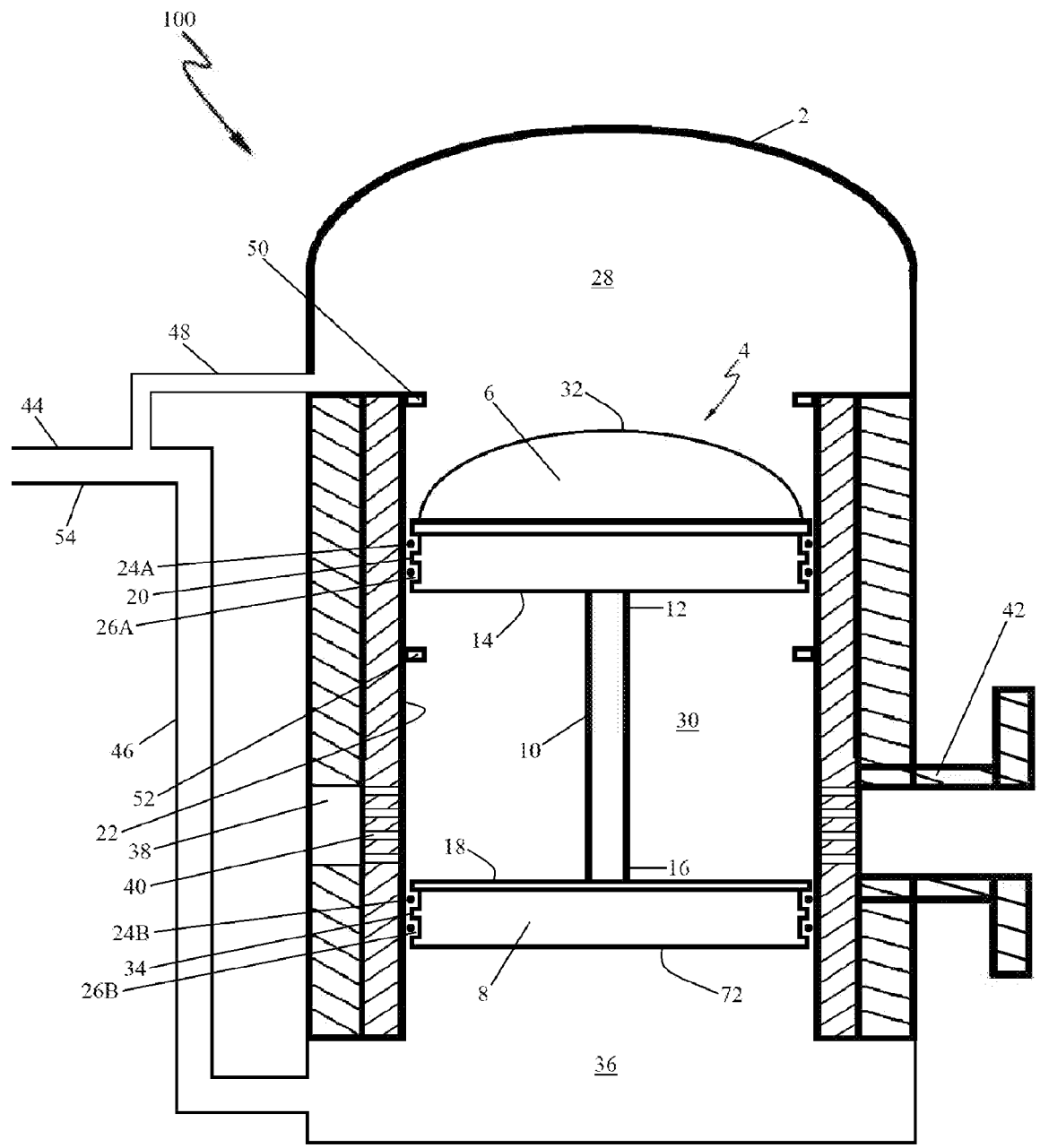
FIG. 1 is cross-sectional side view of an embodiment of a flow controlling apparatus of the present invention in a sealed configuration.

The exemplary embodiments are best understood by referring to the drawings, like numerals being used for like and corresponding parts of the various drawings. In the following description of embodiments, orientation indicators such as "top," "bottom," "up,' "down," "upper," "lower," "front," "back," etc. are used for illustration purposes only; the invention, however, is not so limited, and other possible orientations are contemplated.

Referring first to FIG. 1, in one embodiment a flow control apparatus 100 comprises a vessel 2. In one embodiment, vessel 2 is a sealable container adapted and configured to accommodate the liquid whose flow there through is to be controlled. In one embodiment, vessel 2 comprises 316L stainless steel, although the invention is not so limited and vessel 2 may comprise any useful material(s), such as, but not limited to, other metals or metal alloys, plastic, polycarbonate, or graphite. In one embodiment (not shown), vessel 2 may be insulated, as would be understood by one skilled in the art. In one embodiment (not shown), vessel 2 may be equipped with a temperature control mechanism, such as, but not limited to, a steam jacket. In one aspect, such a temperature control mechanism may be positioned proximate at least a portion of the exterior of vessel and/or integral therewith. In one embodiment, at least a portion of vessel 2 may be substantially tubular in shape.

In one embodiment, disposed within vessel 2 is a sealing component 4. In one embodiment, sealing component 4 comprises an upper plate assembly 6, a lower plate assembly 8, and a substantially vertically oriented plate connector rod 10. In one embodiment, plate connector rod 10 is attached at an upper end 12 thereof to a bottom surface 14 of upper plate assembly 6 and/or plate connector rod 10 is attached at a lower end 16 thereof to a top surface 18 of lower plate assembly 8. In another embodiment, upper end 12 of plate connector rod 10 may be integral to upper plate assembly 6 and/or lower end 16 of plate connector rod 10 may be integral to lower plate assembly 8. In various embodiments, upper plate assembly 6 and/or lower plate assembly 8 may comprise a single component or a plurality of components, as would be understood by one skilled in the art. In one embodiment, upper plate assembly 6 and/or lower plate assembly 8 may be substantially horizontally circular in shape. In one embodiment, a top surface 32 of upper plate assembly 6 is dome shaped, as depicted in FIG. 1.

In one embodiment, sealing component 4 is disposed substantially vertically within vessel 2. In one embodiment, a side surface 20 of upper plate assembly 6 is disposed proximate a portion of the interior wall 22 of vessel 2. In one embodiment, upper plate assembly 6 is equipped with one or more sealing members 24A. In one embodiment, at least one of the sealing members 24A is disposed substantially circumferentially around a portion of upper plate assembly 6. In one embodiment, side surface 20 of upper plate assembly 6 comprises one or more grooves 26A into which at least a portion of a sealing member 24A may be positioned. In one embodiment, sealing component 4 is positioned within vessel 2 such that at least a portion one or more sealing members 24A abuts interior wall 22 of vessel 2, whereby upper plate assembly 6 fluidly segregates an upper internal section 28 of vessel 2 from a middle internal section 30 of vessel 2.

In one embodiment, a side surface 34 of lower plate assembly 8 is disposed proximate a portion of the interior wall 22 of vessel 2. In one embodiment, lower plate assembly 8 is equipped with one or more sealing members 24B. In one embodiment, at least one of the sealing members 24B is disposed substantially circumferentially around a portion of lower plate assembly 8. In one embodiment, side surface 34 of lower plate assembly 8 comprises one or more grooves 26B into which at least a portion of a sealing member 24B may be positioned. In one embodiment, sealing component 4 is positioned within vessel 2 such that at least a portion one or more sealing members 24B abuts interior wall 22 of vessel 2, whereby lower plate assembly 8 fluidly segregates a lower internal section (sump) 36 of vessel 2 from middle internal section 30 of vessel 2.

In one embodiment, a sealing member 24A and/or 24B may be an O-ring. As would be understood by one skilled in the art, an O-ring 24A, 24B may comprise any suitable material, such as but not limited to, an elastomer. In one embodiment, an elastomeric O-ring 24A and/or 24B may comprise silicone. In other embodiments, an O-ring 24A, 24B may comprise a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

In other embodiments, a sealing member 24A and/or 24B may be a piston ring. A piston ring 24A, 24B may comprise any suitable material. In one embodiment, a piston ring 24A, 24B comprises metal and/or graphite. In one embodiment, a piston ring 24A, 24B comprises cast iron or chromium steel. In one aspect, a piston ring 24A, 24B may be (or be similar to) a standard automotive compression piston ring, such as piston rings available from Federal-Mogul Powertrain of Southfield, Michigan. In various embodiments, a piston ring 24A, 24B may comprise one or more coating materials on at least a portion of the exterior surface thereof, or have at least a portion of its exterior surface hardened, hardfaced, hardbanded, etc., as is known within the art.

In one embodiment, vessel 2 comprises one or more fluid conduits 38 disposed at least partially within interior wall 22 thereof. In one embodiment, a conduit 38 may be substantially annular in shape and horizontally oriented. In one embodiment, a conduit 38 may extend circumferentially about vessel 2. In one embodiment, vessel 2 comprises a plurality of orifices (e.g., holes, slits, etc.) 40 which penetrate interior wall 22 and provide for fluid communication between the interior of vessel 2 and at least one conduit 38. In one aspect, at least one fluid conduit 38 is in fluid communication with a fluid outlet 42.

In other embodiments (not shown), vessel 2 may be provided wherein fluid outlet 42 is in direct fluid communication with the interior thereof, i.e., wherein no orifices 40 and fluid conduits 38 are employed. In such embodiments, liquid within sump 36 can flow directly into fluid outlet 42 when flow control apparatus 100 is in an "open" configuration as described below.

In one embodiment, flow control apparatus 100 comprises a liquid inlet line 44 which is fluidly connected to sump 36. In one embodiment, liquid inlet line 44 comprises a substantially horizontal segment 54 and a substantially vertical segment 46. As is described in detail below, the appropriate height and internal diameter of vertical segment 46 is determined by the density of the liquid (not shown) and the weight of sealing component 4. In one embodiment, flow control apparatus 100 comprises a vapor equalization line 48 which provides for pressure equalization between upper internal section 28 and liquid inlet line 44.

In one embodiment, sealing component 4 is adapted and configured to be vertically displaceable within vessel 2. In the embodiment shown in FIG. 1, the sealing component 4 is in a vertical position wherein any liquid (not shown) in sump 36 is prevented by lower plate assembly 8 from entering any orifices 40; i.e., flow control apparatus 100 is in a "closed" configuration with regard to liquid flow there through.

Figure 2:
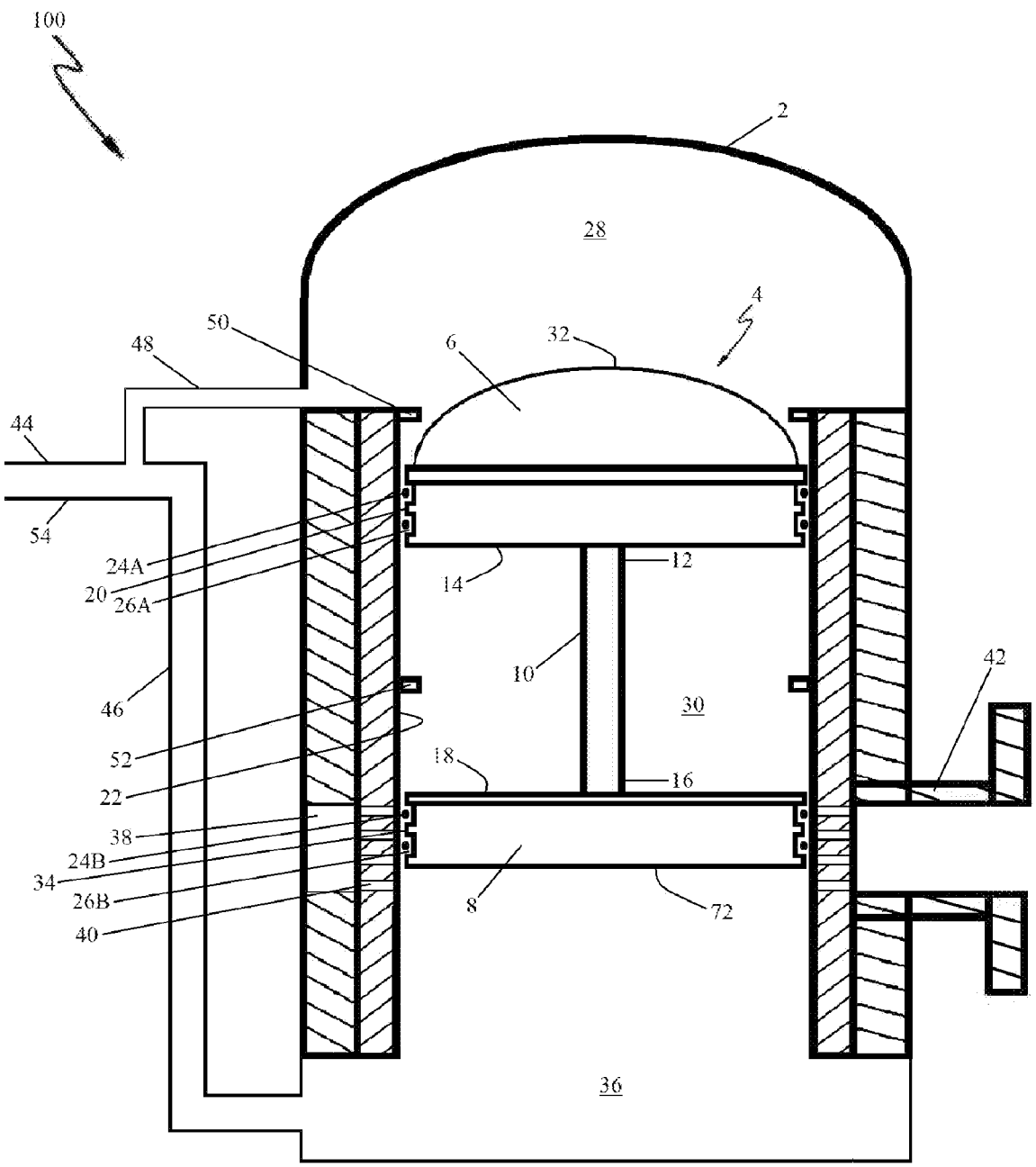
FIG. 2 is a cross-sectional side view of the embodiment of a flow controlling apparatus of the present invention depicted in FIG. 1 in an open configuration.

Referring now to FIG. 2, flow control apparatus 100 is depicted in an "open" configuration with regard to liquid flow there through. In one aspect, when the weight of liquid (not shown) in sump 36 and vertical segment 46 has forced lower plate assembly 8 (and therefore sealing component 4) upward such that liquid (not shown) in sump 36 may enter at least some of orifices 40, the liquid (not shown) flows into one or more fluid conduits 38 and out of flow control apparatus 100 via fluid outlet 42.

In one embodiment, flow control apparatus 100 may be equipped with one or more upper vertical stops 50, as shown in FIGS. 1 and 2. In the embodiment depicted in FIGS. 1 and 2, an upper vertical stop 50 may be affixed to or integral with interior wall 22 of vessel 2, although the invention is not so limited. In one embodiment, an upper vertical stop 50 may extend circumferentially horizontally along interior wall 22, although other configurations may be employed. In one aspect, upper vertical stop(s) 50 is/are adapted and configured such that when sealing component 4 (and therefore upper plate assembly 8) is displaced upward, the upper vertical stop(s) 50 prevent upward movement of sealing component 4 beyond a certain height, as such upward movement is blocked by contact between top surface 32 of upper plate assembly and the upper vertical stop(s) 50.

In one embodiment, flow control apparatus 100 may be equipped with one or more lower vertical stops 52, as shown in FIGS. 1 and 2. In the embodiment depicted in FIGS. 1 and 2, a lower vertical stop 52 may be affixed to or integral with interior wall 22 of vessel 2. In one embodiment, a lower vertical stop 52 may extend circumferentially horizontally along interior wall 22, although other configurations may be employed. In one aspect, lower vertical stop(s) 52 is/are adapted and configured such that when sealing component 4 (and therefore upper plate assembly 8) is displaced downward, the lower vertical stop(s) 52 prevent downward movement of sealing component 4 beyond a certain height, as such downward movement is blocked by contact between bottom surface 14 of upper plate assembly and the lower vertical stop(s) 52.

Figure 3:
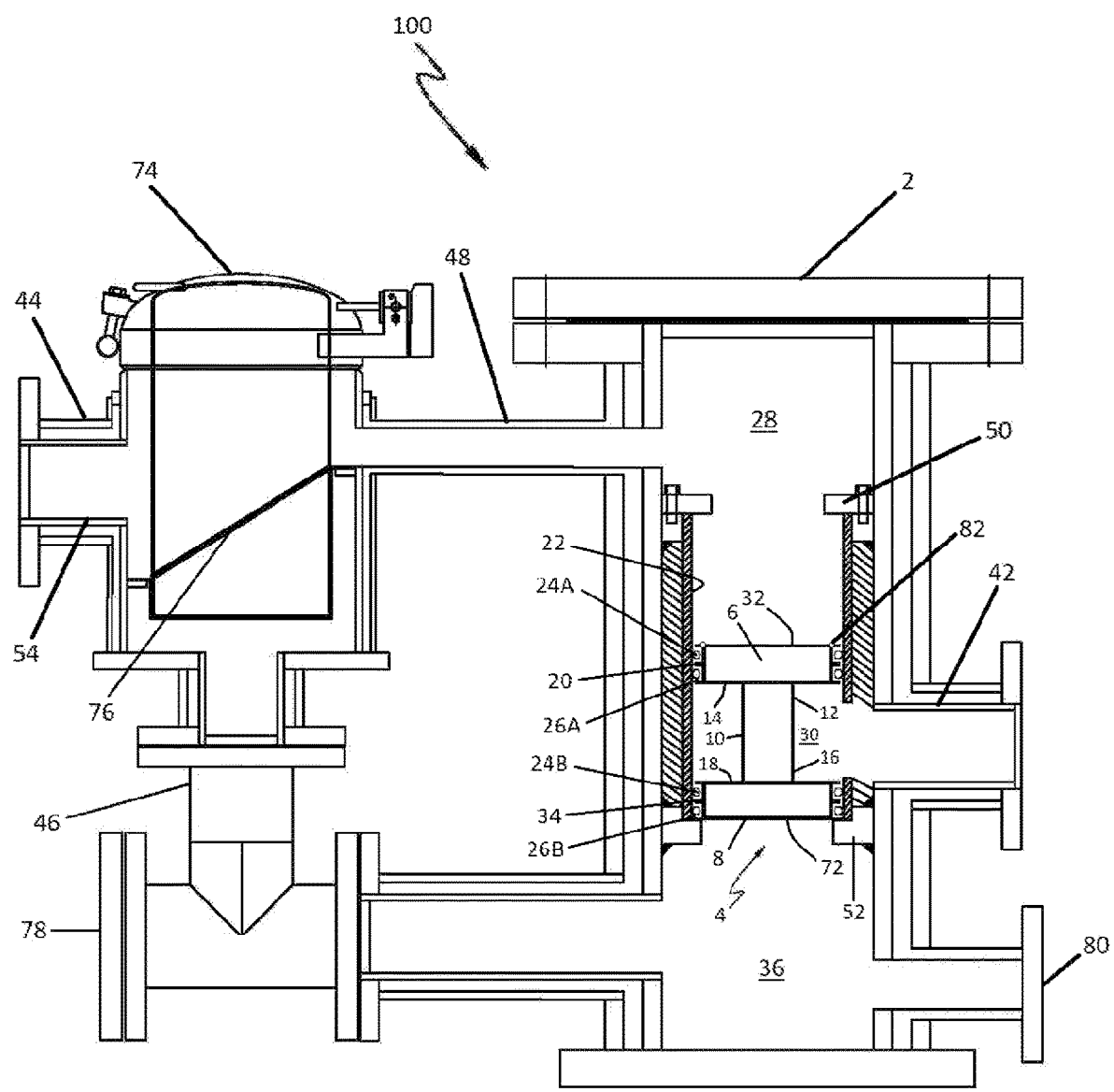
FIG. 3 is a cross-sectional side view of another embodiment of a flow controlling apparatus of the present invention in a sealed configuration.

Referring now to FIG. 3, another embodiment of a flow control apparatus 100 is depicted. In this embodiment, a pre-filter assembly 74 is provided such that liquid (not shown) flowing into the control apparatus 100 via the liquid inlet line 44 flows through one or more filter elements 76 contained within the pre-filter assembly 74. In one embodiment, as shown in FIG. 3, vapor (and any liquid entrained therein) flows, vapor equalization line 48, from vessel 2 upper internal section 28 into the pre-filter assembly 74 above the filter element(s) 76, while in other embodiments (not shown) the vapor equalization line 48 is plumbed to the pre-filter assembly 74 below the filter element(s) 76 or is plumbed directly to vertical segment 46, thereby bypassing the pre-filter assembly 74.

In one embodiment, one or more filter elements 76 may comprise a substantially planar component comprising a plurality of orifices (holes) extending therethrough, although the invention is not so limited and filtration means, such as, but not limited to, mesh filters, may be employed. In one embodiment, a filter element 76 may comprise substantially round holes having a diameter of about $3/32$ of an inch, although other hole geometries and/or diameters may be employed. In one embodiment, a filter element 76 may comprise a plurality of holes each having the same geometry and diameter, although the invention is not so limited and a filter element 76 may comprise holes having different geometries and/or diameters. In one aspect, the filter element(s) 76 trap solids to prevent such insoluble impurities from reaching the vessel 2. In one embodiment, a pre-filter assembly 74 may be equipped with mechanism, such as, but not limited to, a reversibly attachable lid (not separately labeled) for opening the pre-filter assembly 74 so that the filter element(s) 76 can be readily replaced and/or cleaned, as would be understood by one skilled in the art.

In one embodiment, a filter element 76 may be disposed in a slanted orientation within a pre-filter assembly 74, as depicted in FIG. 3; however, the invention is not so limited and other orientations of filter element(s) 76 may be employed. In other embodiments (not shown), filter elements 74 may be disposed in the same orientation or in different orientations within a pre-filter assembly 74.

In one embodiment, a flow control apparatus 100 comprises a rod out segment 78 whereby high-pressure fluids and/or rod-out tools may be utilized to clear certain internal sections of the flow control apparatus 100 which may become clogged with residual substances, as would be understood by one skilled in the art. In one embodiment, a flow control apparatus 100 may comprise on or more drain segments 80, whereby the flow control apparatus 100 may be partially or substantially completely drained of liquids independently from fluid outlet 42.

In one embodiment of a flow control apparatus 100, a vessel 2 interior wall 22 may comprise a surface (not separately labeled) or a portion thereof having a low coefficient of friction. That is, at least a portion of the surface of interior wall 22 may comprise smooth, low-friction composition whereby sealing component 4 may more easily slide vertically between the interior walls 22, as described in detail below. In various embodiments, such a surface (or portion thereof) possesses a coefficient of friction of less than about 0.1. In various embodiments, a low-friction interior wall 22 surface may comprise a coating, such as, but not limited to, a fluoropolymer (such as Xylan®, Teflon®, Nicklon, etc.), tungsten disulfide, and/or graphite/graphene). In one embodiment, an interior wall 22 and/or the surface thereof may comprise a ceramic material.

Still referring to FIG. 3, in one embodiment a sealing component 4 may be equipped with one or more blowby sealing members 82. In one aspect, sealing members 82 may serve to limit flow (blowby) of liquid past sealing component 4 into upper internal section 28. In one embodiment, a sealing member 82 may comprise an O-ring, although the invention is not so limited and other blowby sealing members may be employed, as would be understood by one skilled in the art. In one embodiment, a blowby sealing member 82 may comprise a polymeric material, such as, but not limited to, AFLAS®, or any other useful sealing member material, as would be understood by one skilled in the art. In one embodiment, a PERFLAS® blowby sealing member 82 may be employed.

Figure 4:
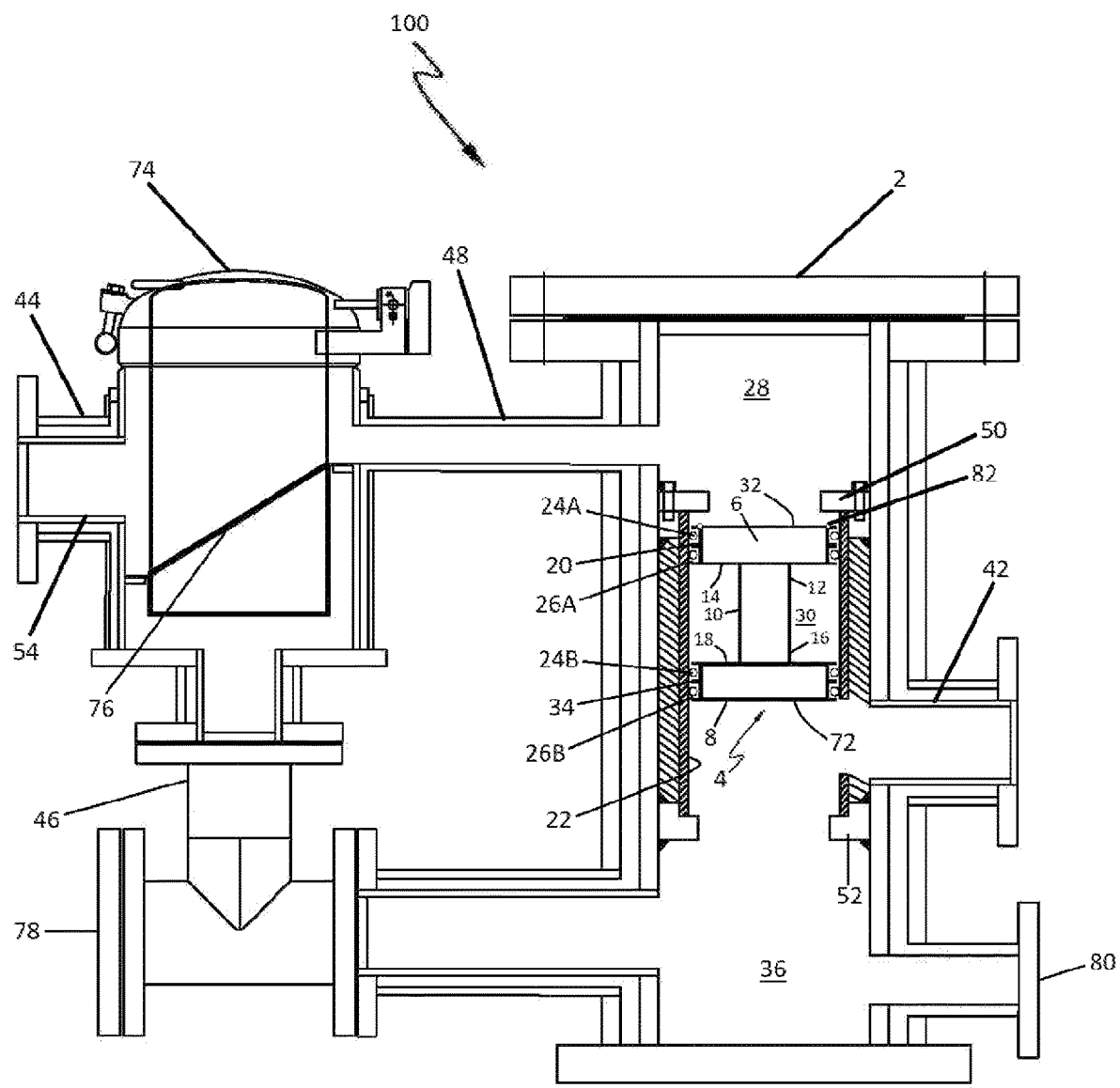
FIG. 4 is a cross-sectional side view of the embodiment of a flow controlling apparatus of the present invention depicted in FIG. 3 in an open configuration.

The embodiment of FIG. 3 depicts a flow control apparatus 100 is in a "closed" configuration with regard to liquid flow there through, as described above with regard to FIG. 1. Referring now to FIG. 4, an embodiment of the flow control apparatus 100 shown in FIG. 3 is depicted in an "open" configuration with regard to liquid flow there through, as described above with regard to FIG. 2.

In other embodiments of a flow control apparatus 100 as depicted in FIGS. 3 and 4 (not shown), as described above, vessel 2 comprises one or more fluid conduits 38 disposed at least partially within interior wall 22 thereof. In one embodiment, a conduit 38 may be substantially annular in shape and horizontally oriented. In one embodiment, a conduit 38 may extend circumferentially about vessel 2. In one embodiment, vessel 2 comprises a plurality of orifices (e.g., holes, slits, etc.) 40 which penetrate interior wall 22 and provide for fluid communication between the interior of vessel 2 and at least one conduit 38. In one aspect, at least one fluid conduit 38 is in fluid communication with a fluid outlet 42.

Operation

Generally, a flow control apparatus 100 is provided proximate a liquid source (not shown) whose flow is to be controlled. The liquid (not shown), such as, but not limited to, molten sulfur, is allowed to flow into horizontal segment 54 of liquid inlet line 44. In one aspect, it may be preferable to maintain a vapor space above the liquid within horizontal segment 54. The liquid then flows downward through vertical segment 46 of liquid inlet line 44 and into sump 36 of vessel 2. In one embodiment, the flow control apparatus 100 is actuated when sump 36 is full and a sufficient level (weight) of liquid has collected in vertical segment 46. The appropriate internal dimensions of vertical segment 46 are determined by taking into account the density of the liquid and the weight of sealing component 4 (along with frictional drag thereof along interior wall 22) such that when a desired amount of liquid is present within vertical segment 46, the weight thereof forces liquid upward against a bottom surface 72 of lower plate assembly 8, and forces lower plate assembly 8, and therefore sealing component 4, upward sufficiently to allow for the liquid to enter one or more of orifices 40, which is/are no longer blocked by lower plate assembly 8. Liquid that enters an orifice 40 flows through a conduit 38 and out of flow control apparatus 100 via liquid outlet 42. Thus, flow control apparatus 100 allows for downstream flow of the liquid only when a desired quantity thereof has accumulated.

In one embodiment, as sealing component 4 rises and falls, vapor pressure in upper internal section 28 is equalized by vapor flow (in either direction) through vapor equalization line 48. In one aspect, a domed configuration of top surface 32 of upper plate assembly 6 serves to minimize collection of any liquid (not shown) present in upper internal section 28 by allowing for gravity drainage thereof back into liquid inlet line via vapor equalization line 48. In one embodiment, to minimize collection of any liquid (not shown) present in upper internal section 28, vapor equalization line 48 may be disposed vertically proximate upper vertical stop 50, as depicted in FIGS. 1 and 2.

Figure 1A:
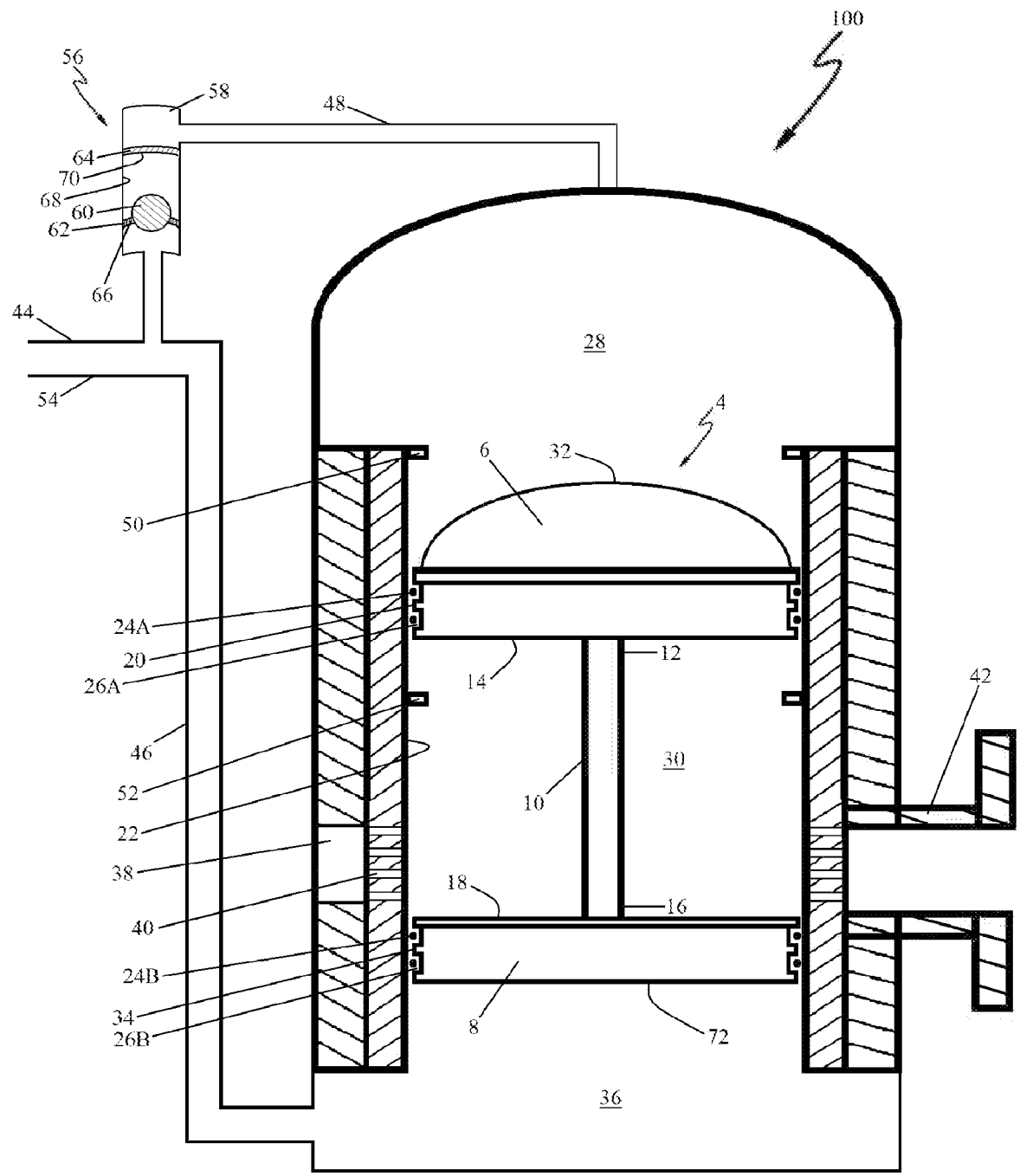
FIG. 1A is a cross-sectional side view of an embodiment of a flow controlling apparatus of the present invention in a sealed configuration.

Referring now to FIG. 1A, an embodiment of a flow control apparatus 100 comprising an embodiment of another vapor equalization system is depicted. An embodiment of a vapor equalization system 56 is shown in FIG. 1A. In the embodiment of FIG. 1A, vapor equalization system 56 comprises a vapor equalization chamber 58 in-line with vapor equalization line 48, although other configurations may be employed. In one embodiment, vapor equalization system 56 comprises, within vapor equalization chamber 58, a flotation member 60, a flotation member seat 62, and a flotation member stop 64.

In one embodiment, flotation member 60 comprises a substantially spherical component, although the invention is not so limited and other shapes are contemplated. In one embodiment, flotation member seat 62, which may be attached to or integral with the interior wall 68 of vapor equalization chamber 58, comprises a substantially annular component that extends horizontally at least partially circumferentially about the interior of vapor equalization chamber 58. In one embodiment, flotation member seat 62 comprises a single component, although the invention is not so limited and other configurations may be employed. In one embodiment, flotation member seat 62 comprises one or more openings 66 extending vertically there through. In one embodiment, a flotation member stop 64 comprises a substantially annular component that protrudes from interior wall 68 of vapor equalization chamber 58 and extends horizontally circumferentially about the interior of vapor equalization chamber 58. In one embodiment, a flotation member stop 64 comprises a beveled bottom surface 70.

In one embodiment, when vapor equalization chamber 58 is substantially devoid of liquid, flotation member 60, which has an external diameter greater than the internal annular diameter of flotation member seat 62, rests on flotation member seat 62. In such a situation, vapor pressure equilibrates between upper internal section 28 and liquid inlet line 44 by means of vapor equalization line 48 and vapor flow through vapor equalization chamber 58 via one or more of the openings 66, as would be understood by one skilled in the art. In one embodiment, when liquid (not shown) is introduced to vapor equalization chamber 58 (due to, e.g., a pressure surge in liquid inlet line 44), liquid may force flotation member 60 upward into at least partial abutment with flotation member stop 64, which has an internal annular diameter less than the external diameter of flotation member 60. In such a situation, flotation member 60, in conjunction with flotation member stop 64, substantially prevents liquid within vapor equalization chamber 58 from flowing into upper internal section 28. In one aspect, such sealing of vapor equalization chamber 58 (from flotation member stop 64 downward) further induces the pressurized liquid to flow through vertical segment 46, where increased pressure triggers actuation of flow control apparatus 100 and the liquid is able to exit the system via fluid outlet 42, as previously described.

Referring now to FIGS. 3 and 4, a flow control apparatus 100 is provided proximate a liquid source (not shown) whose flow is to be controlled. The liquid (not shown), such as, but not limited to, molten sulfur, is allowed to flow into horizontal segment 54 of liquid inlet line 44. In one aspect, it may be preferable to maintain a vapor space above the liquid within horizontal segment 54. The liquid flows into pre-filter assembly 74, and flows downward through filter element 76. The filtered liquid then flows downward through vertical segment 46 of liquid inlet line 44 and into sump 36 of vessel 2, and the flow control apparatus operates as described above regarding FIGS. 1 and 2.

In other embodiments (not shown), flow control apparatus 100 may be equipped with other known pressure relief devices and systems, such as, but not limited to, devices and systems fluidly connected to upper internal section 28, such as a vapor equalization system 56 or the like as described above with regards to FIG. 1A.

Method

An exemplary method of flow control utilizing an embodiment of a flow control apparatus 100 of the present invention comprises:

A Flow Control Apparatus Provision Step, comprising providing a flow control apparatus 100 in fluid communication with a liquid source, whereby liquid is able to be introduced to the flow control apparatus via a liquid inlet line, such as liquid inlet line 44;

A Liquid Introduction Step, comprising flowing liquid through the liquid inlet line and, directly or indirectly, into a sump, such as sump 36; and A Flow Control Apparatus Actuation Step, comprising flowing sufficient liquid into the flow control apparatus such that a volume of the liquid accumulates in a vertical segment of the liquid inlet line, such as vertical segment 46, such that a sealing component, such as sealing component 44, is vertically displaced, whereby a portion of the liquid is provided to orifices, such as orifices 40, and liquid flows, via one or more fluid conduits, such as fluid conduits 38, out of the flow control apparatus via a fluid outlet, such as fluid outlet 42.

The foregoing method is merely exemplary, and additional embodiments of a method of utilizing a flow control apparatus of the present invention consistent with the teachings herein may be employed. In addition, in other embodiments, one or more of these steps may be performed concurrently, combined, repeated, re-ordered, or deleted, and/or additional steps may be added.

The foregoing description of the invention illustrates exemplary embodiments thereof. Various changes may be made in the details of the illustrated construction and process within the scope of the appended claims by one skilled in the art without departing from the teachings of the invention. Disclosure of existing patents, publications, and/or known art incorporated herein by reference is to the extent required to provide details and understanding of the disclosure herein set forth. The present invention should only be limited by the claims and their equivalents.

I claim:
1. A flow control apparatus comprising:
a vessel;
a sealing component comprising:
an upper plate assembly;
a lower plate assembly; and a plate connector rod connecting said upper plate assembly to said lower plate assembly;
a vapor equalization line;
a liquid inlet line comprising a substantially vertical segment; and
a liquid outlet;
wherein:
said sealing component is vertically displaceable within said vessel;
said liquid inlet line substantially vertical segment is fluidly connected to a sump of said vessel;
an upper internal section of said vessel above said upper plate assembly is in fluid communication with said liquid inlet line, directly or indirectly, via said vapor equalization line;
when liquid in said substantially vertical segment of said liquid inlet line provides sufficient force to a bottom surface of said lower plate assembly and causes said sealing component to be displaced sufficiently upward, liquid in said sump flows out through said liquid outlet; and
said flow control apparatus comprises
at least a portion of an interior wall of said vessel comprising a surface material having a low coefficient of friction.

2. The flow control apparatus of claim 1, wherein said vessel comprises one or more orifices through an interior wall thereof which are each fluidly connected to at least one fluid conduit.

3. The flow control apparatus of claim 2, wherein at least one said fluid conduit is fluidly connected to said liquid outlet.

4. The flow control apparatus of claim 1, wherein the flow control apparatus comprises a pre-filter assembly equipped with one or more filter elements.

5. The flow control apparatus of claim 4, wherein at least one said filter element is disposed in a slanted orientation within said pre-filter assembly.

6. The flow control apparatus of claim 1, comprising a rod out segment.

7. The flow control apparatus of claim 1, comprising a drain segment fluidly connected to said sump of said vessel.

8. The flow control apparatus of claim 1, wherein said sealing component is equipped with one or more blowby sealing members disposed on a top surface thereof.

9. The flow control apparatus of claim 1, wherein said vessel is equipped with a stopping mechanism selected from the group consisting of:
an upper stop that limits upward movement of said sealing component;
a lower stop that limits downward movement of said sealing component; and
both an upper stop that limits upward movement of said sealing component and a lower stop that limits downward movement of said sealing component.

10. The flow control apparatus of claim 1, wherein said vessel comprises an interior wall, wherein at least a portion of a surface thereof comprises a ceramic material.

11. A method of utilizing a flow control apparatus, comprising:
providing the flow control apparatus of claim 1; and
introducing a liquid to said sump, directly or indirectly, via said liquid inlet line and said substantially vertical segment thereof, such that the weight of liquid in said substantially vertical segment causes said liquid in said sump to force said lower plate assembly, and therefore said sealing component, sufficiently upward such that liquid flows out through said liquid outlet via at least one of said orifices and one of said fluid conduits.

12. The method of claim 11, wherein:
said flow control apparatus comprises a pre-filter assembly equipped with one or more filter elements; and
said liquid is introduced directly to said pre-filter assembly and said liquid passes therethrough to said liquid inlet line substantially vertical segment.

13. The method of claim 11, wherein at least a portion of an interior wall of said vessel comprises a surface material comprising a ceramic material.

* * * * *